(12) United States Patent
Feldman et al.

(10) Patent No.: US 9,872,060 B1
(45) Date of Patent: Jan. 16, 2018

(54) WRITE CONFIRMATION OF A DIGITAL VIDEO RECORD CHANNEL

(71) Applicant: Disney Enterprises, Inc., Burbank, CA (US)

(72) Inventors: Vladislav Feldman, Manhasset Hills, NY (US); Michael J. Strein, Bohemia, NY (US); Steven Machanic, Dumont, NJ (US); Efthimis Stefanidis, Douglaston, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/195,547

(22) Filed: Jun. 28, 2016

(51) Int. Cl.
| | | |
|---|---|---|
| *H04N 21/4425* | (2011.01) | |
| *H04N 21/4147* | (2011.01) | |
| *G11B 27/36* | (2006.01) | |
| *H04N 5/76* | (2006.01) | |
| *H04N 5/268* | (2006.01) | |
| *H04N 21/61* | (2011.01) | |
| *H04N 21/426* | (2011.01) | |
| *H04N 21/2383* | (2011.01) | |
| *G06F 11/00* | (2006.01) | |

(52) U.S. Cl.
CPC ......... *H04N 21/4147* (2013.01); *G11B 27/36* (2013.01); *H04N 5/268* (2013.01); *H04N 5/76* (2013.01); *H04N 21/2383* (2013.01); *H04N 21/42661* (2013.01); *H04N 21/4425* (2013.01); *H04N 21/6125* (2013.01); *G06F 11/00* (2013.01)

(58) Field of Classification Search
CPC .......... H04N 21/2383; H04N 21/4147; H04N 21/4425; H04N 21/42661; H04N 21/6125; G06F 11/00
See application file for complete search history.

(56) References Cited

U.S. PATENT DOCUMENTS

| | | | | |
|---|---|---|---|---|
| 7,839,937 | B2 * | 11/2010 | Cordero | H04N 21/426 375/240.29 |
| 8,341,662 | B1 * | 12/2012 | Bassett | H04N 5/4401 375/240.26 |
| 9,521,455 | B1 * | 12/2016 | Gupta | H04L 65/4084 |
| 2003/0088689 | A1 * | 5/2003 | Alexander, Jr. | H04L 29/06 709/232 |
| 2007/0098268 | A1 * | 5/2007 | Beresford | G06F 17/30811 382/224 |
| 2008/0276290 | A1 * | 11/2008 | Hamada | H04H 20/12 725/105 |

(Continued)

*Primary Examiner* — Pinkal R Chokshi (74) *Attorney, Agent, or Firm* — Patterson + Sheridan, LLP (57) ABSTRACT

Systems, methods, and computer program products to perform an operation comprising receiving a first unit of video data on a first input/output (I/O) channel, of a plurality of I/O channels of a digital video recorder, computing a first value by applying an error-detecting function to the first unit of video data, attempting to write the first unit of video data to a storage location of a storage device communicably coupled to the digital video recorder, computing, after attempting to write the first unit of video data, a second value by applying the error-detecting function to a data stored at the storage location of the storage device, and upon determining that the first and second values are not equal, storing an indication that the first unit of video data was not successfully written to the storage location of the storage device.

20 Claims, 7 Drawing Sheets

(56) References Cited

U.S. PATENT DOCUMENTS

| | | | | |
|---|---|---|---|---|
| 2009/0106804 A1* | 4/2009 | Bhogal | .............. | H04N 7/17318 |
| | | | | 725/110 |
| 2011/0247033 A1* | 10/2011 | Okada | .................... | H04N 19/61 |
| | | | | 725/31 |
| 2012/0176540 A1* | 7/2012 | Labrozzi | ............ | H04N 21/4312 |
| | | | | 348/468 |
| 2012/0320988 A1* | 12/2012 | Kamiya | ................. | H04N 19/90 |
| | | | | 375/240.18 |
| 2013/0266073 A1* | 10/2013 | MacInnis | ................. | H04N 7/56 |
| | | | | 375/240.24 |
| 2016/0014433 A1* | 1/2016 | Raina | .................... | H04N 19/86 |
| | | | | 375/240.27 |
| 2016/0094861 A1* | 3/2016 | Caron | .................. | H04N 19/70 |
| | | | | 375/240.16 |

* cited by examiner

WRITE CONFIRMATION OF A DIGITAL VIDEO RECORD CHANNEL

BACKGROUND

Field of the Disclosure

Embodiments disclosed herein relate to digital video recording systems. More specifically, embodiments disclosed herein relate to providing immediate write confirmation of a digital video record channel without using a dedicated playback channel.

Description of the Related Art

Digital video recording systems may be used to record video data to storage devices, such as hard disks, solid state drives, and the like. Digital video recording systems may include any number of channels (such as 4, 8, or 16 channels). Each channel must be configured as either a playback channel (also referred to as a read channel) or a record channel (also referred to as a write channel) which records video data to media. However, a given channel cannot be configured as both a playback channel and a record channel. Conventionally, to ensure that video is properly written by a record channel, a playback channel may be assigned as a confidence playback channel for a record channel. A confidence playback channel reads the video recorded by a designated record channel and outputs the recorded video data (if present) to a monitor for viewing by a user. This lets the user verify that the video was in fact written to storage media, or that an error has occurred. However, using the confidence playback channel ties up twice the amount of resources, namely the record channel and a playback channel, limiting the number of available channels in a given product.

SUMMARY

In one embodiment, a method comprises receiving a first unit of video data on a first input/output (I/O) channel, of a plurality of I/O channels of a digital video recorder, computing a first value by applying an error-detecting function to the first unit of video data, attempting to write the first unit of video data to a storage location of a storage device communicably coupled to the digital video recorder, computing, after attempting to write the first unit of video data, a second value by applying the error-detecting function to a data stored at the storage location of the storage device, and upon determining that the first and second values are not equal, storing an indication that the first unit of video data was not successfully written to the storage location of the storage device.

In another embodiment, a computer-readable storage medium stores instructions which when executed by a processor performs an operation comprising receiving a first unit of video data on a first input/output (I/O) channel, of a plurality of I/O channels of a digital video recorder, computing a first value by applying an error-detecting function to the first unit of video data, attempting to write the first unit of video data to a storage location of a storage device communicably coupled to the digital video recorder, computing, after attempting to write the first unit of video data, a second value by applying the error-detecting function to a data stored at the storage location of the storage device, and upon determining that the first and second values are not equal, storing an indication that the first unit of video data was not successfully written to the storage location of the storage device.

In still another embodiment, a digital video recorder comprises a processor, a plurality of I/O channels, a storage device, and logic configured to perform an operation comprising receiving a first unit of video data on a first input/output (I/O) channel, of the plurality of I/O channels of the digital video recorder, computing a first value by applying an error-detecting function to the first unit of video data, attempting to write the first unit of video data to a storage location of a storage device communicably coupled to the digital video recorder, computing, after attempting to write the first unit of video data, a second value by applying the error-detecting function to a data stored at the storage location of the storage device, and upon determining that the first and second values are not equal, storing an indication that the first unit of video data was not successfully written to the storage location of the storage device.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein provide techniques to confirm that a digital video recorder has recorded video data to storage without using a dedicated playback channel for each record channel. Specifically, embodiments disclosed herein apply an error-detecting function to the video data in a video stream (e.g., a serial digital interface (SDI) signal, and/or an internet protocol (IP) video stream) before the video data is written and then again after the video data is written to memory. The error-detecting function may be, for example and without limitation, a checksum, a cyclic redundancy check (CRC), and the like. The pre-write and post-write applications of the error-detecting function may produce a respective value (e.g., a checksum value or CRC value), which may then be compared. If the values for a given unit of video data do not match, an error may have occurred, and an indication of the error may be outputted via a user interface. However, if the pre-write and post-write values match, that unit of video data was recorded properly, and a corresponding indication may be outputted via the user interface.

Figure 1A:
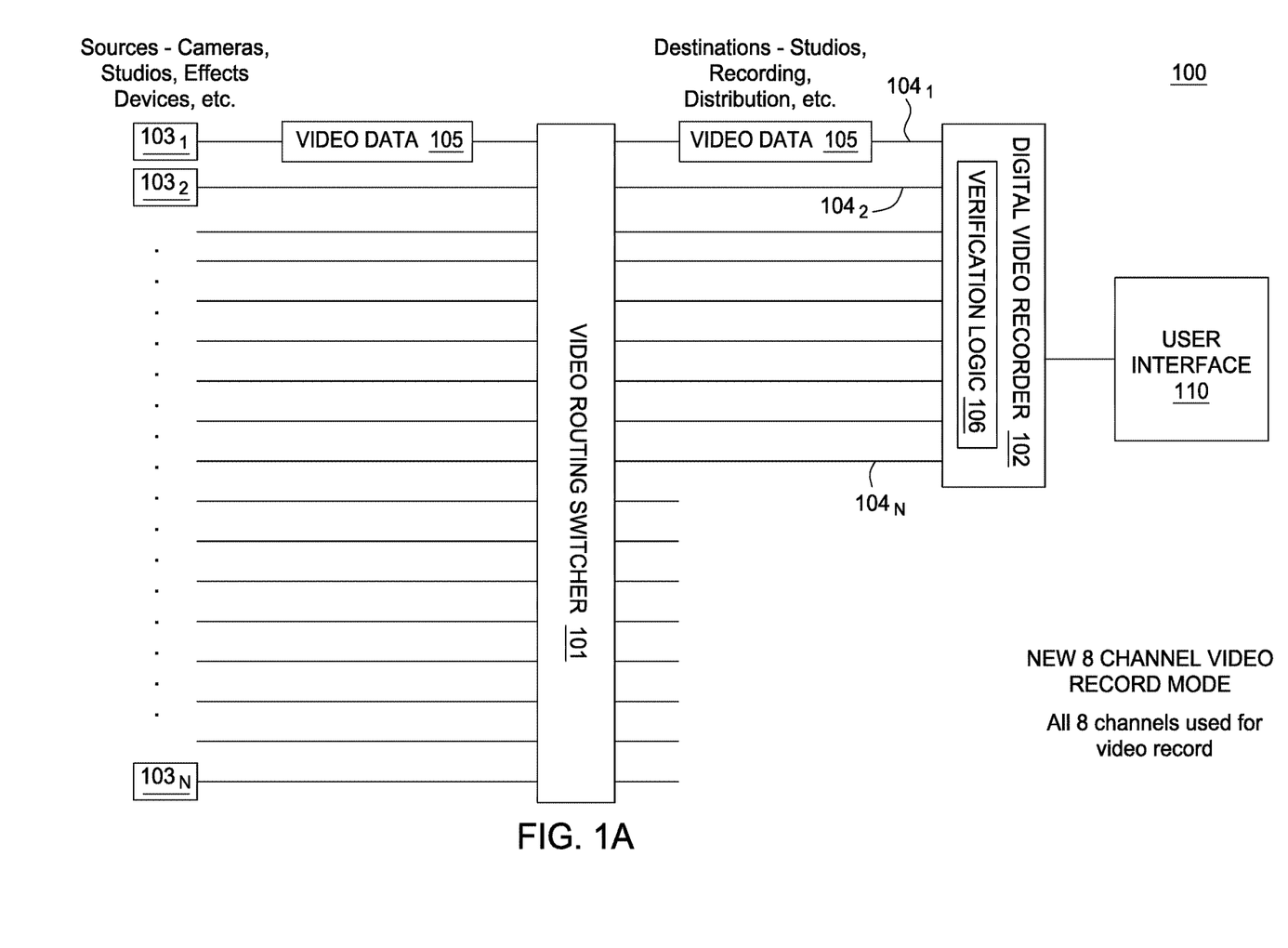
FIGS. 1A-1B illustrate systems configured to provide immediate write confirmation of digital record channels in digital video recorders, according to various embodiments.

FIG. 1A illustrates a system 100 which provides immediate write confirmation of digital record channels in a digital video recorder, according to one embodiment. As shown, the system 100 includes a video routing switcher 101, a digital video recorder 102, a plurality of video sources $103_{1-N}$, and a user interface 110. The video routing switcher 101 is a device configured to forward video from the video sources $103_{1-N}$ to one or more destinations, such as production studios, recording devices (e.g., the digital video recorder 102), distribution sites, and the like. The video sources $103_{1-N}$ are representative of any type of hardware or software which may provide video data 105, such as video cameras, graphics insertion devices, computers, effects devices, studios, production systems, and the like. In the embodiment pictured in FIG. 1A, the video data 105 is a video signal carrying video frames (e.g., an SDI signal defined by Society of Motion Picture and Television Engineers® (SMPTE®) 292 (HD), SMPTE 259 (SD), SMPTE 2082 (UHD), or any other version of the SMPTE defined SDI interfaces). In other embodiments, the video data 105 may be of other signal and format types, such as compressed transport streams carried over an Asynchronous Serial Interface (ASI).

The digital video recorder 102 is a hardware unit configured to record video to internal and/or external storage media (not pictured). As shown, the digital video recorder 102 may receive video data 105 from one or more input/output (I/O) interfaces (or channels) $104_{1-N}$. However, each I/O channel $104_{1-N}$ may be configured as a record channel or a playback channel, but not both. For example, the digital video recorder 102 may have eight I/O channels $104_{1-8}$. Conventionally, to ensure the digital video recorder 102 is properly recording the video data, four of the eight I/O channels $104_{1-8}$ would be configured as record channels, while the remaining four I/O channels $104_{1-8}$ are configured as playback channels. Each of the playback channels $104_{1-8}$ would be assigned to one of the record channels $104_{1-8}$, and output the recorded video data 105 to a monitor (not pictured).

Figure 3:
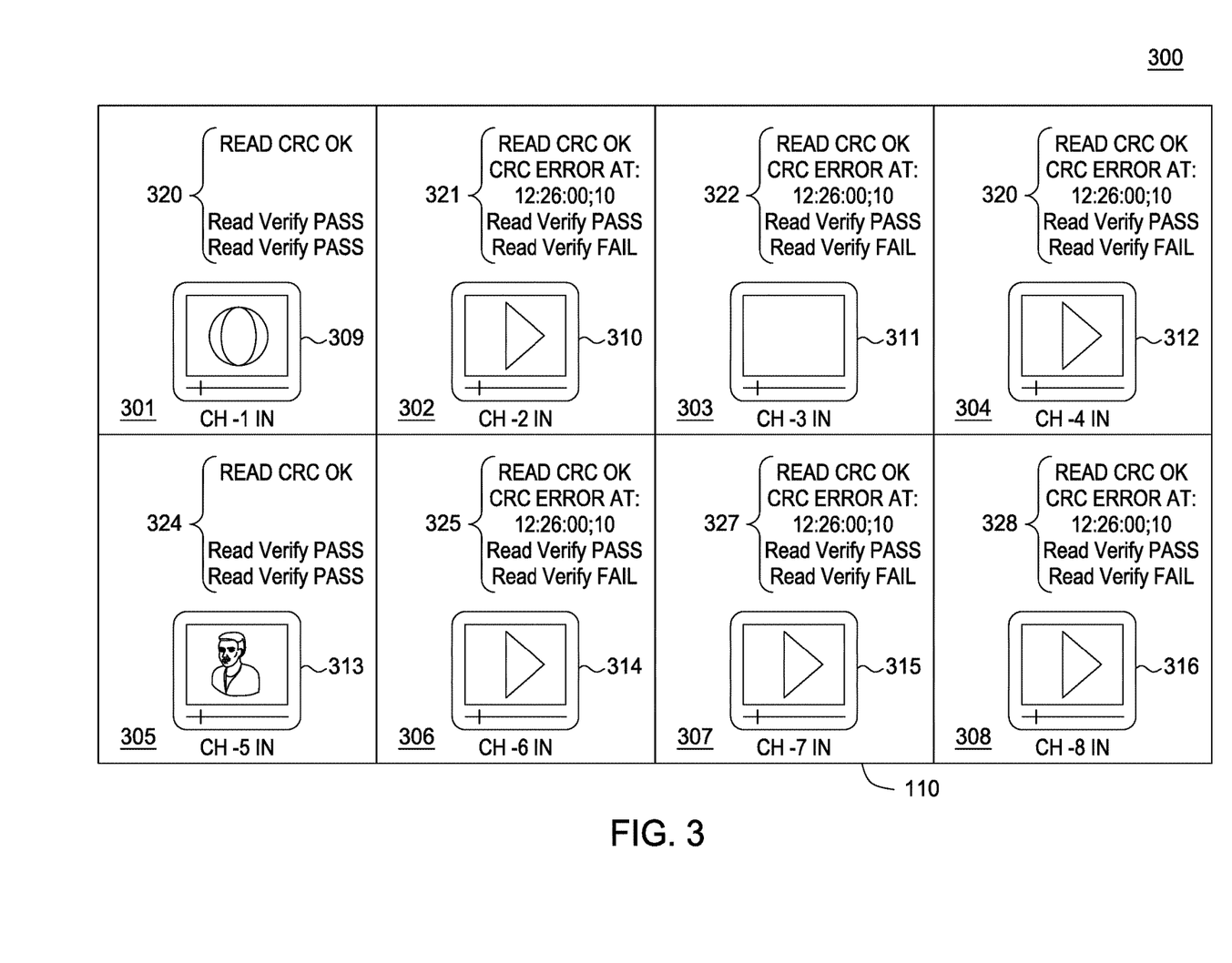
FIG. 3 illustrates an example graphical user interface which provides immediate write confirmation of digital record channels, according to one embodiment.

Advantageously, however, the digital video recorder 102 includes the verification logic 106. The verification logic 106 is configured to verify that each of the I/O channels $104_{1-N}$ (each of which can be configured as a record channel) is properly recording video data to storage. The verification logic 106 may apply an error-detecting function to a unit of video data 105 (e.g., one or more frames in an SDI signal, or a portion of video data stored in one or more IP packets) both before and after the I/O channels $104_{1-N}$ attempt to write the video data 105 to storage. As used herein, the "error-detecting" function includes any type of verification function (or algorithm), such as a checksum function or a CRC function. Although any type of error-detecting function may be used, the checksum function may be used herein as a non-limiting example for the sake of clarity. Applying the checksum function to the video data 105 produces a checksum value. The verification logic 106 may compare the checksum values produced by applying the checksum function to the unit of video data 105 before and after the record operation. If the result of the comparison indicates that the checksum values match, the verification logic 106 may determine that the record operation for that given unit of video data, performed by one of the I/O channels $104_{1-N}$, was successful. However, if the checksum values do not match, the verification logic 106 may determine that the record operation was not successful (e.g., an error occurred at some point). The checksum comparison may further reflect whether the video data was properly compressed, as further described below. The result of the comparison operation (and other metadata) may then be outputted to a user via the user interface 110. An example user interface 110 is depicted in FIG. 3, described in greater detail below.

Figure 1B:
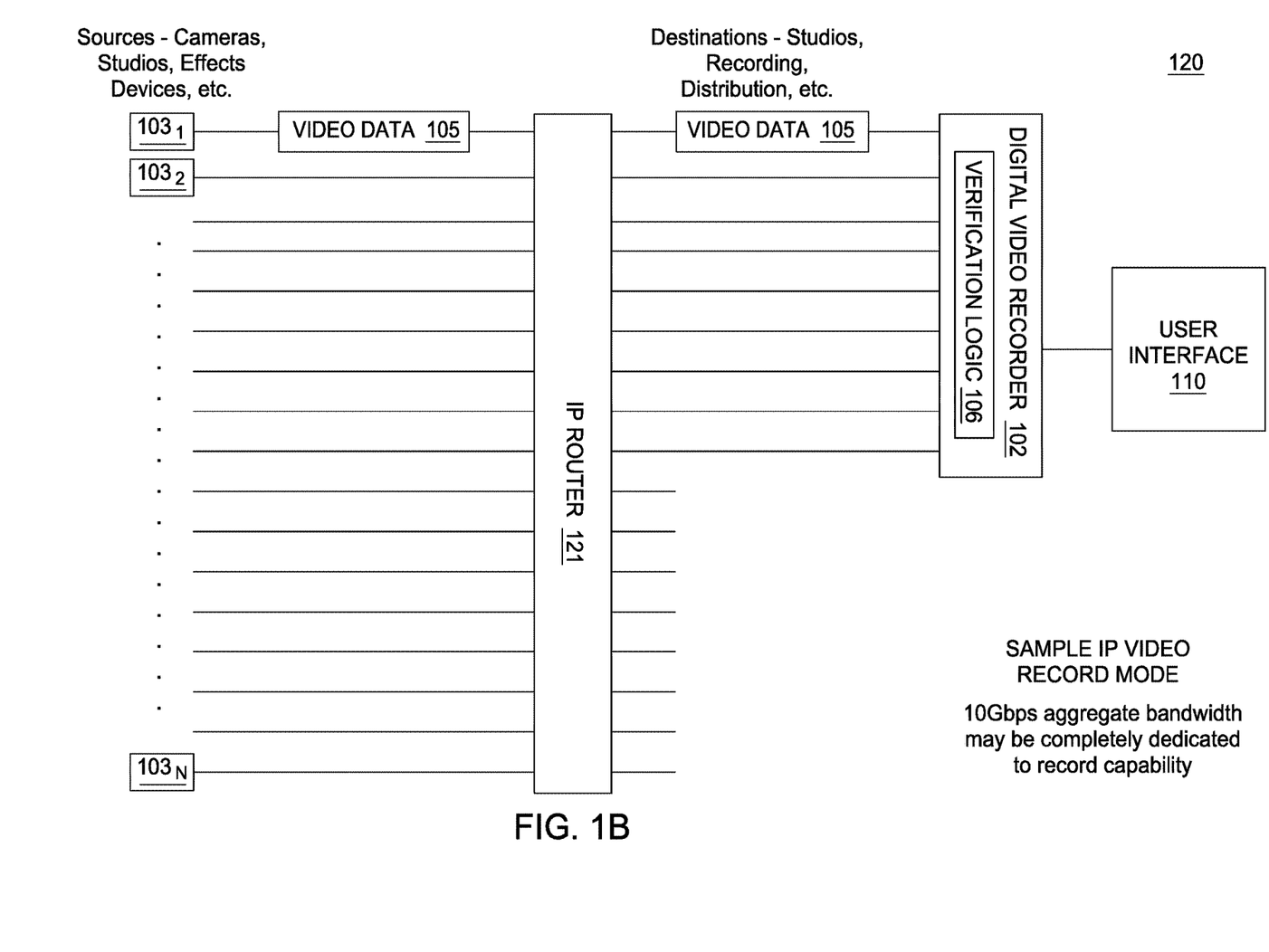

FIG. 1B illustrates a system 120 which provides immediate write confirmation of digital record channels in a digital video recorder, according to another embodiment. Generally, FIG. 1B depicts an IP-based video domain, where the video data 105 is encapsulated in IP packets (not pictured). As shown, the system 120 includes the video sources $103_{1-N}$, an IP router 121, the digital video recorder 102, and the user interface 110. As in FIG. 1A, the video sources $103_{1-N}$ may transmit video data 105 to one or more destinations (including the digital video recorder 102) via the IP router 121. The IP router 121 is an Internet Protocol router which routes data packets according to one or more routing rules. As in FIG. 1B, the digital video recorder 102 has one or more I/O channels $104_{1-N}$ that may receive the IP packets carrying the video data 105. The digital video recorder 102 may then extract the video data 105 from the IP packets, and write the video data 105 to storage media.

When configured as an IP-based digital video recorder 102, the digital video recorder 102 may have a maximum aggregate bandwidth. For example, the digital video recorder 102 may read and/or write a maximum aggregate bandwidth of 10 gigabits per second (Gbps) across all I/O channels $104_{1-N}$. Conventional digital video recorders providing a confidence playback channel may only utilize 5 Gbps for recording, and 5 Gbps for playback (or reading). Advantageously, however, the digital video recorder 102 includes the verification logic 106, allowing the digital video recorder 102 to fully utilize the 10 Gbps bandwidth for recording video while providing some indication as to the status of the various record operations via the user interface 110.

The verification logic 106 may compute a checksum on the video data 105 both before and after the digital video recorder 102 attempts to record the video data 105. For example, the verification logic 106 may compute a checksum on the video data 105 encapsulated in a predefined number of IP packets before the video data 105 is written to disk. The verification logic 106 may then determine where the video data 105 is recorded (or a storage location where the recording was attempted), and compute a checksum on the data stored at this location. If the checksums match, the verification logic 106 may determine that the record operation was successful. If the checksums do not match, the verification logic 106 may store an indication that the record operation for that unit of video data on the corresponding I/O channel 104 failed. The user interface 110 may provide, in real time, a status indicator reflecting whether the record operations are successful.

Figure 2:
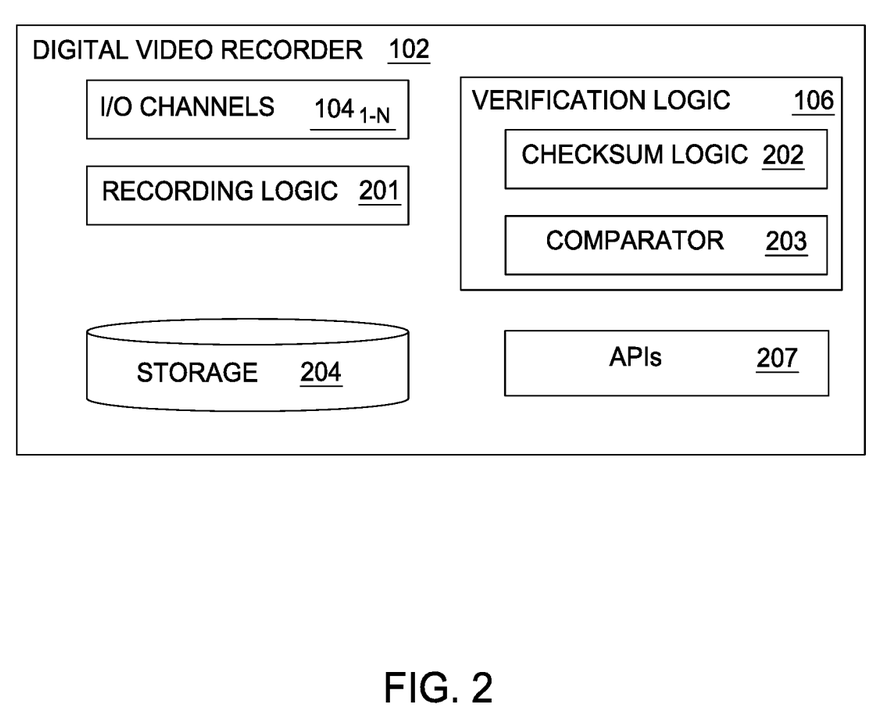
FIG. 2 is a logical view of components of an example digital video recorder, according to one embodiment.

FIG. 2 is a logical view of components of an example digital video recorder 102, according to one embodiment. As shown, the digital video recorder 102 includes the I/O channels $104_{1-N}$, the verification logic 106, a recording logic 201, a storage 204, and a set of application programming interfaces (APIs) 207. The I/O channels $104_{1-N}$, the verification logic 106, the recording logic 106, and the APIs may be implemented as hardware, software, or any combination thereof. The digital video recorder 102 may be SDI-based, IP-based, or hybrid. In an SDI-based digital video recorder 102, the I/O channels $104_{1-N}$ operate on an SDI video stream. In an IP-based digital video recorder 102, the I/O channels $104_{1-N}$ operate on video data that is encapsulated in IP packets. A hybrid digital video recorder 102 includes both IP-based and SDI-based I/O channels $104_{1-N}$ However, any type of digital video recorder 102 may be used, and the use of any particular type of digital video recorder 102 should not be considered limiting of the disclosure.

The recording logic 201 writes video data received by one or more of the I/O channels $104_{1-N}$ to the storage 204. In embodiments where video data is encapsulated in IP packets, the recording logic 201 extracts the video data from multiple packets and assembles the video data. In some embodiments, the recording logic 201 may compress the video data using a compression algorithm prior to storing the video data in the storage 204. In IP-based settings, the video data encapsulated in IP packets may be compressed or uncompressed. In such embodiments, the recording logic 201 may transcode the video data prior to recompressing and storing the video data in the storage.

The storage 204 is representative of one or more storage devices, such as hard drives, solid state drives, optical media, and the like. Although depicted as being located in the digital video recorder 102, the storage devices 204 may be internal or external storage devices.

As shown, the verification logic 106 includes a checksum logic 202 and a comparator 203. The checksum logic 202 and comparator 203 may be implemented as hardware, software, or any combination thereof. The checksum unit 202 is generally configured to compute a checksum of one or more bits of data. As previously indicated, the checksum logic 202 may be replaced by other suitable logic configured to validate data (such as CRC logic). When an I/O channel $104_{1-4}$ receives video data, the verification logic 106 may invoke the checksum logic 202 to compute a checksum for a predefined unit of video data before the unit of video data is recorded by the recording logic 201 to storage 204. The unit of video data may correspond to any unit of video data, such as 1,024 bits, 1 megabyte, a video frame, a track, an entire video file, and the like. Once the unit of video data is recorded to the storage 204, the recording logic 201 may provide, to the verification logic 106, an indication of a storage a location in the storage 204 where the video data is stored. For example, the recording logic 201 may specify a memory address, disk information (e.g., platter, track, and sector information), and the like. The verification logic 106 may then invoke the checksum logic 202 to perform a checksum on the data stored at the specified location in the storage 204.

The comparator 203 is logic configured to compare checksums, CRCs, or the result of any error-detecting function applied to the video data before and after the video data is stored in the storage 204. For example, the checksum logic 202 may provide, to the comparator 203, the checksum values produced by checksumming a unit of video data before and after the unit of video data is recorded to the storage 204. The comparator 203 may then compare the checksums, returning an indication as to whether the checksum values match. If the checksum values match, both the compression and recording of the video data was successful. If the checksum values do not match, an error has occurred in one or more of the compression and/or recording of the video data by the digital video recorder 202. The verification logic 106 may store the checksums, a result of a comparison, and metadata associated with the video data (e.g., a specific I/O channel 104 which processed the video data) in the storage 204.

In embodiments where the recording logic 201 transcodes and/or compresses the video data before writing the video data to the storage 204, the verification logic 106 invokes the checksum logic 202 to compute a checksum for the video after the transcoding and/or compression operations complete and before the transcoded and/or compressed video data is recorded to the storage 204. Once the recording logic 201 writes the transcoded and/or compressed video data to the storage 204, the verification logic 106 again invokes the checksum logic 202 to compute a checksum for the transcoded and/or compressed video data that has been written to the storage 204, and the comparator 203 may then compare the computed checksum values as described above.

The APIs 207 provide interfaces to data in the digital video recorder 102, such as the data in the storage 204. For example, a first API 207 may provide, to a web-based or other remote system, status indicators as to whether each I/O channel $104_{1-N}$ is recording video properly. Doing so allows a user to determine whether the video is properly compressed and safely recorded to the storage 204. A second API 207 may provide a still low-resolution frame of the video data from recorded by each I/O channel $104_{1-N}$ to the storage 204. Generally, the APIs 207 may provide any metadata attribute, such as checksum or CRC status indicators, progress indicators, points of failure, and the like.

FIG. 3 illustrates an example graphical user interface (GUI) 110 which provides immediate write confirmation of digital record channels, according to one embodiment. Generally, a user may wish to monitor the status of a digital video recorder 102. In at least one embodiment, the GUI 110 may be generated by an external application (e.g., a web application) which communicates with the APIs 207 of the digital video recorder 102 to provide real-time data in the GUI 110. In at least one embodiment, however, the digital video recorder 102 includes logic configured to generate the GUI 110, where the user accesses the GUI 110 from a remote machine.

In the embodiment depicted in FIG. 3, the GUI 110 provides information for a digital video recorder 102 having eight I/O channels. As shown, therefore, the GUI 110 includes regions 301-308, each of which correspond to a single channel of the digital video recorder 102. As shown, each channel includes a still low resolution icon 309-316. The icon 309-316 may be periodically extracted from the storage 204 and rendered in the GUI 110. Generally, the icons 309-316 provide an indication as to whether video data is properly stored in the storage 204. For example, as shown, icon 309 depicts an in-flight basketball, which may indicate that the compression and recording of a basketball game by the corresponding I/O channel is operating properly. Similarly, icon 313 depicts a person, indicating the corresponding I/O channel is compressing and recording video properly. However, as shown, icon 311 is blank, indicating no video data is being recorded (or that the video data is not being properly compressed). Therefore, a user may easily identify errors in the digital video recorder 102.

As shown, each region 301-308 includes metadata 320-328, respectively. The metadata 320-328 may include any attribute of the digital video recorder 102. As shown, the metadata 320-328 includes the example metadata attributes for each I/O channel of the digital video recorder 102. The example metadata attributes include a status of a read CRC operation, a location of a failure (if any), and a status of a read verification. For example, the metadata 320 reflects that the read CRC of the current unit of video data is OK, and that the read verification operations passed. However, as shown, the metadata 322 indicates that a CRC error occurred at the 12:26:00 mark of a video.

Generally, the GUI 110 may be updated periodically (e.g., every second, every 10 seconds, and the like) to reflect a real-time status of the recording operations performed by the digital video recorder 102. If an error is detected, the metadata attributes 320-328 may change color, be highlighted, or modified by any other effect. Similarly, the GUI 110 may create a popup notification, email notification, or text message notification when an error is detected. Again, doing so allows users to verify that the digital video recorder 102 is properly recording video without using a dedicated playback channel. Instead, in this embodiment, all channels of the digital video recorder 102 are used to record video data.

Figure 4:
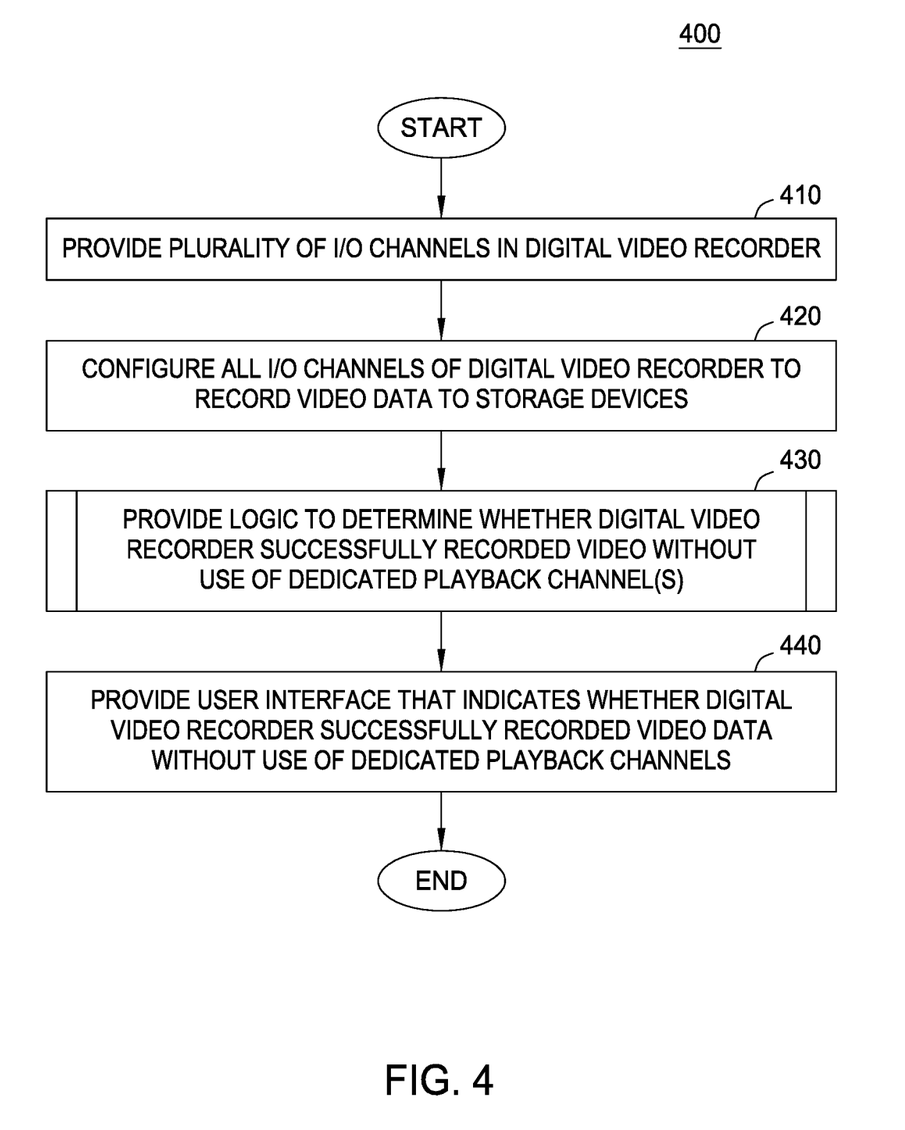
FIG. 4 is a flow chart illustrating a method to provide immediate write confirmation of digital record channels in a digital video recorder, according to one embodiment.

FIG. 4 is a flow chart illustrating a method 400 to provide immediate write confirmation of digital record channels in a digital video recorder, according to one embodiment. As shown, the method begins at block 410, where a digital video recorder having a plurality of I/O channels is provided. One example of such a digital video recorder is the digital video recorder 102. The I/O channels 104 of the digital video recorder 102 may be SDI-based, IP-based, or a hybrid digital video recorder combining both SDI and IP functionality. At block 420, each of the I/O channels 104 of the digital video recorder 102 are configured to record video data to one or more storage devices. For example, a user may manually configure each I/O channel 104 as record channels, and not playback (or read) channels. Similarly, a manufacturer of the digital video recorder 102 may configure the I/O channels 104 as record channels during manufacturing or production of the digital video recorder 102.

At block 430, logic is provided in the digital video recorder 102 which determines whether the digital video recorder 102 successfully recorded video without the use of dedicated playback channels. One example of such logic is the verification logic 106. The verification logic 106 may compute a checksum (or CRC, or any other verification check) on the video data before and after each I/O channel 104 attempts to write the video data to storage. The verification logic 106 may then compare the values produced by the checksum function (or other error-detecting function). If the values match, then the verification logic 106 may determine that the unit of video data was successfully compressed and recorded. If the values do not match, the verification logic 106 may determine that the corresponding unit of video data was not successfully compressed and/or recorded to storage. At block 440, a user interface, such as the GUI 110, may be provided which indicates whether the digital video recorder 102 successfully recorded video data without the use of dedicated playback channels. Generally, the user interface may provide real-time status indicators reflecting the operation of the digital video recorder 102.

Figure 5:
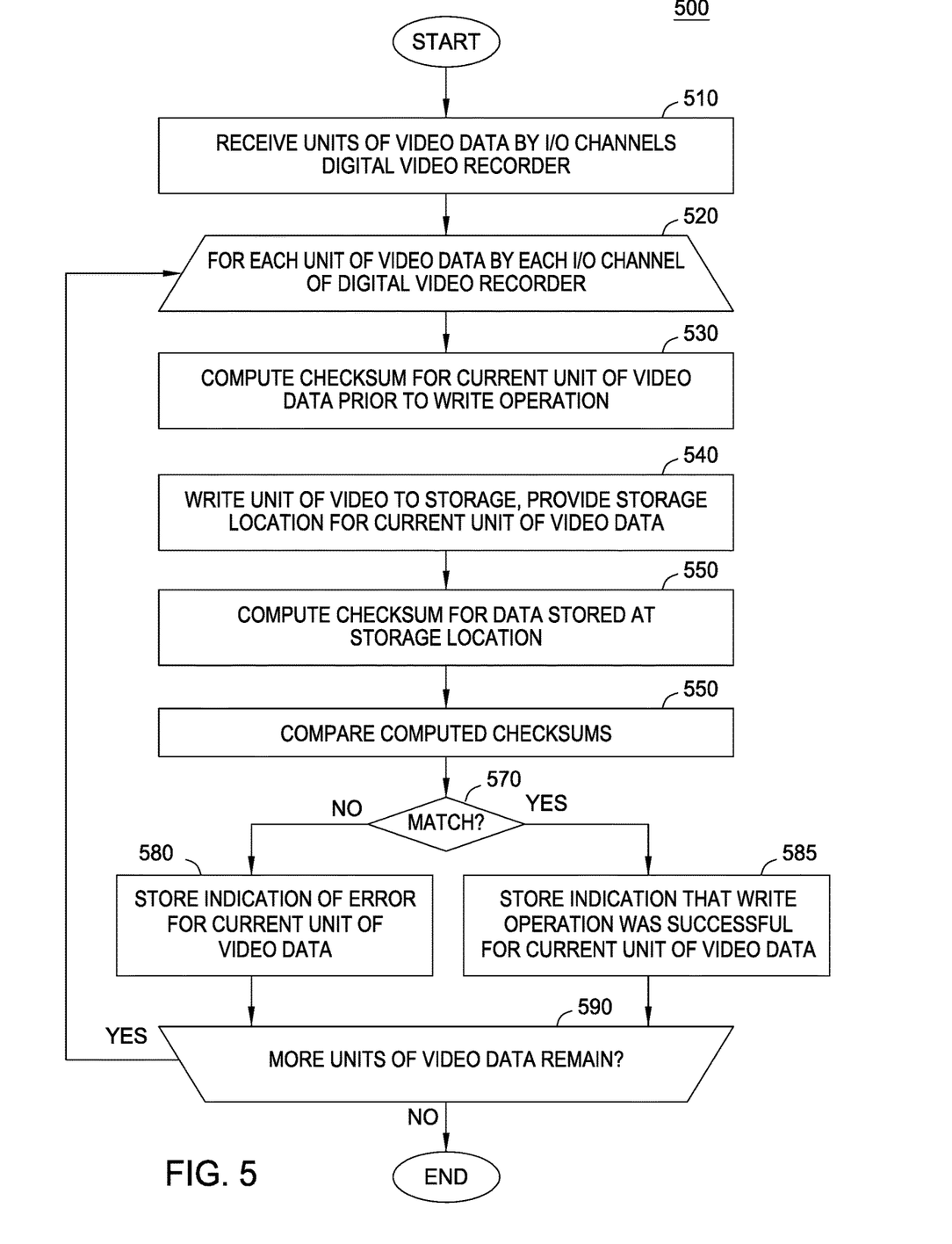
FIG. 5 is a flow chart illustrating a method to determine whether video was successfully recorded without the use of dedicated playback channels in a digital video recorder, according to one embodiment.

FIG. 5 is a flow chart illustrating a method 500 corresponding to block 430 to determine whether a digital video recorder successfully recorded video data without the use of dedicated playback channels, according to one embodiment. As shown, the method 500 begins at block 510, where the I/O channels 104 of the digital video recorder 102 receive units of video data. The units of video data may be in a SDI video signal, encapsulated in IP packets, or both. At block 520, the digital video recorder 102 executes a loop including blocks 530-590 for each unit of video data received by each I/O channel 104. In at least one embodiment, the unit of video data is configurable. For example, a user may define the unit as a 30 second segment of video, a megabyte of video data, or any other unit of data.

At block 530, the checksum logic 202 may compute a checksum value for the current unit of video data by applying an error-detecting function to the current unit of video data. As previously indicated, other suitable error-detecting functions may be used, such as a CRC function. In embodiments where the recording logic 201 compresses the current unit of video data before writing the current unit of video data to storage, the checksum logic 202 computes the checksum value for the current unit of video data after compressing the current unit of video data and before writing the current unit of video data to the storage. At block 540, the recording logic 201 of the digital video recorder 102 may write the current unit of video data to the storage 204. The recording logic 201 may also provide an address of the storage location to the checksum logic 202 at block 540. At block 550, the checksum logic 202 may compute a checksum value for the unit of video data stored at the storage location provided by the recording logic 201. At block 560, the checksum logic 202 may invoke the comparator 203 to compare the checksum values produced at blocks 530 and 550. At block 570, the verification logic 106 determines whether a result of the comparison performed at block 550 is a match. If the checksum values do not match, an error has occurred, and the method proceeds to block 580. If the checksum values match, the video data has been properly compressed and recorded, and the method proceeds to block 585.

At block 580, if the checksums do not match, the verification logic 106 may store an indication that an error occurred in the compression and/or recording operations for the current unit of video data. At block 585, if the checksum values match, the verification logic 106 may store an indication that the write operation was successful for the current unit of video data. Generally, the relevant indications stored at blocks 580 and 585 may be stored in the storage 204 in a record associated with the current unit of video data. The indications may include a still, low-resolution frame of video extracted from the current unit of video data, which may then be outputted to a user via the GUI 110. At block 590, the digital video recorder 102 may determine whether more units of video data remain. If more units of video data remain, the method returns to block 510. Otherwise, the method 500 ends.

Figure 6:
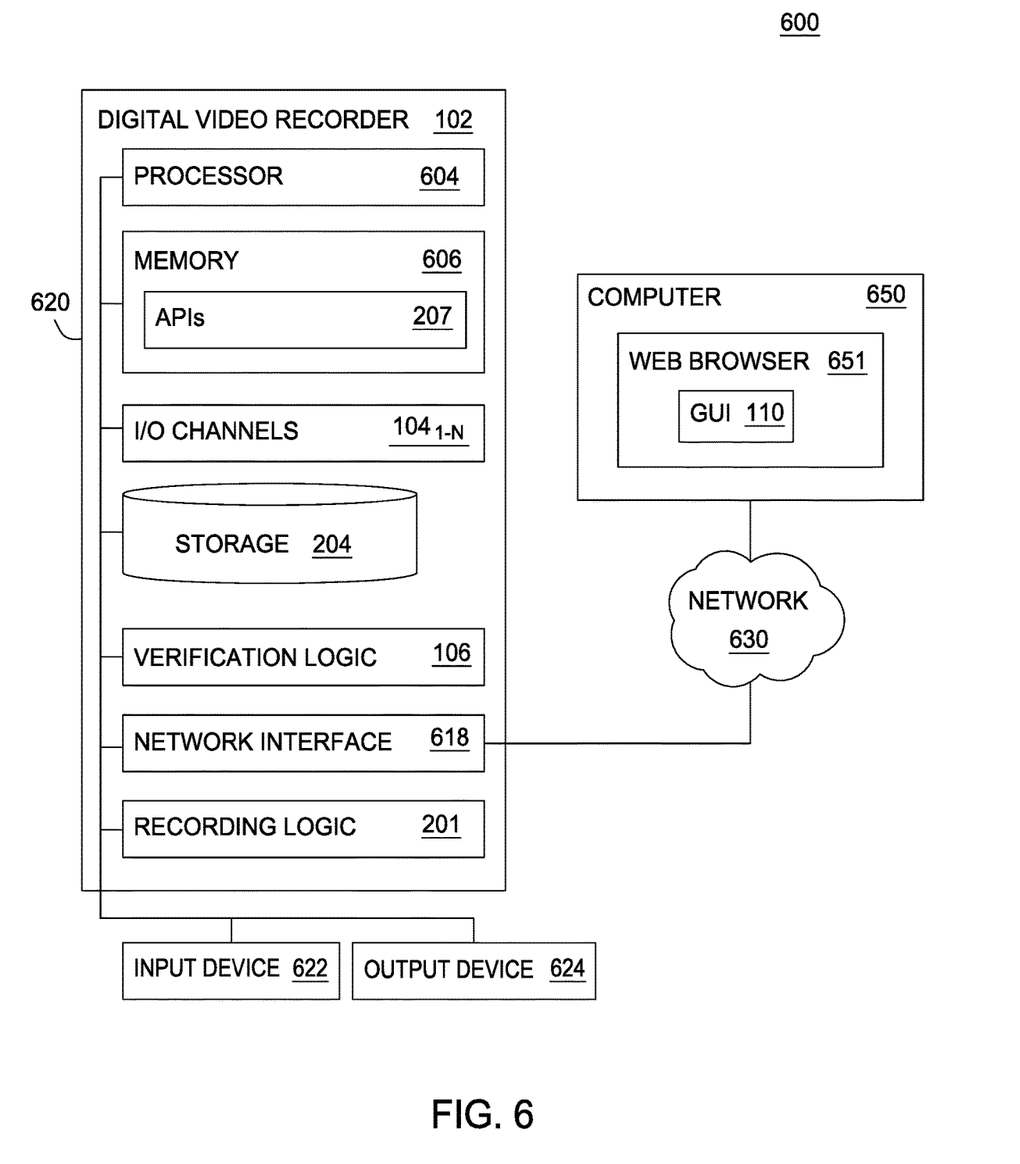
FIG. 6 illustrates a system configured to provide immediate write confirmation of digital record channels, according to one embodiment.

FIG. 6 illustrates a system 600 configured to provide immediate write confirmation of digital record channels, according to one embodiment. The networked system 600 includes the digital video recorder 102. The digital video recorder 102 may also connected to one or more computers 650 via a network 630. In general, the network 630 may be a telecommunications network and/or a wide area network (WAN). In a particular embodiment, the network 630 is the Internet.

The digital video recorder 102 generally includes a processor 604 which obtains instructions and data via a bus 620 from a memory 606, a plurality of I/O channels $104_{1-N}$, and/or a storage 608. The digital video recorder 102 may also include one or more network interface devices 618, input devices 622, and output devices 624 connected to the bus 620. The digital video recorder 102 is generally under the control of an operating system (not shown). Examples of operating systems include the UNIX operating system, versions of the Microsoft Windows operating system, and distributions of the Linux operating system. More generally, any operating system supporting the functions disclosed herein may be used. The processor 604 is a programmable logic device that performs instruction, logic, and mathematical processing, and may be representative of one or more CPUs. The network interface device 618 may be any type of network communications device allowing the digital video recorder 102 to communicate with other computers via the network 630.

The storage 204 is representative of hard-disk drives, solid state drives, flash memory devices, optical media and the like. Generally, the storage 204 stores application programs and data for use by the digital video recorder 102. In addition, the memory 606 and the storage 608 may be considered to include memory physically located elsewhere; for example, on another computer coupled to the digital video recorder 102 via the bus 620. As previously indicated, the storage 204 is configured to store video data received by the digital video recorder 102.

The input device 622 may be any device for providing input to the digital video recorder 102. For example, a keyboard and/or a mouse may be used. The input device 622 represents a wide variety of input devices, including keyboards, mice, controllers, and so on. Furthermore, the input device 622 may include a set of buttons, switches or other physical device mechanisms for controlling the computer 602. The output device 624 may include output devices such as monitors, touch screen displays, and so on.

As shown, the memory 606 contains the APIs 207. The web browser 651 and/or the GUI 110 of the computer 650 may interface with the APIs 207 to display status information and other attributes of the digital video recorder 102. As shown, the digital video recorder 102 also includes the I/O channels $104_{1-N}$, verification logic 106, and the recording logic 201, each described in greater detail above. Generally, the system 600 may include all systems, apparatuses, methods, and functionality described above with reference to FIGS. 1A-1B, and FIGS. 2-5.

Advantageously, embodiments disclosed herein provide digital video recorders that can utilize all I/O channels in record mode while still providing an indication as to whether the recording operations are performed successfully. By freeing channels conventionally used for playback confidence, users may purchase less expensive digital video recorders. More generally, the performance of a given digital video recorder is improved by allowing the digital video recorder to fully utilize all I/O channels in record mode.

In the foregoing, reference is made to embodiments of the disclosure. However, it should be understood that the disclosure is not limited to specific described embodiments. Instead, any combination of the recited features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the recited aspects, features, embodiments and advantages are merely illustrative and are not considered elements or limitations of the appended claims except where explicitly recited in a claim(s). Likewise, reference to "the invention" or "the disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the verification logic 106 could execute on a computing system in the cloud and compute checksums for video data. In such a case, the verification logic 106 could store the checksums at a storage location in the cloud, which may then be accessed by a GUI 110 to indicate whether the record operations completed successfully. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving a first unit of video data of a first video on a first input/output (I/O) channel, of a plurality of I/O channels of a digital video recorder, wherein each of the plurality of I/O channels of the digital video recorder are configured to write video data to a storage device communicably coupled to the digital video recorder;
   computing a first value by applying an error-detecting function to the first unit of video data prior to writing the first unit of video data to the storage device;
   attempting to write the first unit of video data to a first storage location of the storage device;
   computing, after attempting to write the first unit of video data to the first storage location, a second value by applying the error-detecting function to a data stored at the first storage location of the storage device;
   comparing the first and second values; and
   upon determining, based on the comparison and without configuring any of the plurality of I/O channels as a read channel, that the first and second values are not equal, storing an indication that the first unit of video data was not successfully written to the first storage location of the storage device.

2. The method of claim 1, further comprising:
   outputting for display, on a display device communicably coupled to the digital video recorder, an indication that the first unit of video data was not successfully written to the first storage location of the storage device.

3. The method of claim 1, further comprising:
   receiving a second unit of video data of a second video by a second I/O channel of the plurality of I/O channels of the digital video recorder;
   computing, by the error-detecting function, a third value for the second unit of video data;
   attempting to write the second unit of video data to the first storage location of the storage device communicably coupled to the digital video recorder;
   computing, by the error-detecting function, a fourth value for the data stored at the first storage location of the storage device;
   comparing the third and fourth values; and
   upon determining, based on the comparison, that the third and fourth values are equal, storing an indication that the second unit of video data was successfully compressed and written to the first storage location of the storage device.

4. The method of claim 1, wherein each I/O channel of the plurality of I/O channels receives video data of a respective video from a respective video source, of a plurality of video sources, wherein the plurality of I/O channels can be configured as one of a read channel and a write channel, wherein the plurality of video sources comprise: (i) video cameras, (ii) graphics insertion devices, (iii) computing systems, and (iv) video production systems.

5. The method of claim 1, wherein the first unit of video data comprises at least one of: (i) a frame of video carried in a serial digital interface (SDI) signal, (ii) an uncompressed portion of video data encapsulated in an Internet Protocol (IP) packet, (iii) a compressed portion of video data encapsulated in the IP packet, and (iv) a compressed transport stream carried over an Asynchronous Serial Interface (ASI).

6. The method of claim 1, further comprising:
prior to attempting to write the first unit of video data to the first storage location, compressing the first unit of video data according to a compression algorithm, wherein the first value is computed after compressing the first unit of video data and prior to attempting to write the first unit of video data to the first storage location.

7. The method of claim 1, wherein the error-detecting function comprises one of a checksum function and a cyclic redundancy check (CRC) function.

8. A non-transitory computer-readable storage medium having computer-readable program code embodied therewith, the computer-readable program code executable by a processor to perform an operation comprising:
receiving a first unit of video data of a first video on a first input/output (I/O) channel, of a plurality of I/O channels of a digital video recorder, wherein each of the plurality of I/O channels of the digital video recorder are configured to write video data to a storage device communicably coupled to the digital video recorder;
computing a first value by applying an error-detecting function to the first unit of video data prior to writing the first unit of video data to the storage device;
attempting to write the first unit of video data to a first storage location of the storage device;
computing, after attempting to write the first unit of video data to the first storage location, a second value by applying the error-detecting function to a data stored at the first storage location of the storage device;
comparing the first and second values; and
upon determining, based on the comparison and without configuring any of the plurality of I/O channels as a read channel, that the first and second values are not equal, storing an indication that the first unit of video data was not successfully written to the first storage location of the storage device.

9. The computer-readable storage medium of claim 8, the operation further comprising:
outputting for display, on a display device communicably coupled to the digital video recorder, an indication that the first unit of video data was not successfully written to the first storage location of the storage device.

10. The computer-readable storage medium of claim 8, the operation further comprising:
receiving a second unit of video data of a second video by a second I/O channel of the plurality of I/O channels of the digital video recorder;
computing, by the error-detecting function, a third value for the second unit of video data;
attempting to write the second unit of video data to the first storage location of the storage device communicably coupled to the digital video recorder;
computing, by the error-detecting function, a fourth value for the data stored at the first storage location of the storage device;
comparing the third and fourth values; and
upon determining, based on the comparison, that the third and fourth values are equal, storing an indication that the second unit of video data was successfully compressed and written to the first storage location of the storage device.

11. The computer-readable storage medium of claim 8, wherein each I/O channel of the plurality of I/O channels receives video data of a respective video from a respective video source, of a plurality of video sources, wherein the plurality of I/O channels can be configured as one of a read channel and a write channel, wherein the plurality of video sources comprise: (i) video cameras, (ii) graphics insertion devices, (iii) computing systems, and (iv) video production systems.

12. The computer-readable storage medium of claim 8, wherein the first unit of video data comprises at least one of: (i) a frame of video carried in a serial digital interface (SDI) signal, (ii) an uncompressed portion of video data encapsulated in an Internet Protocol (IP) packet, (iii) a compressed portion of video data encapsulated in the IP packet, and (iv) a compressed transport stream carried over an Asynchronous Serial Interface (ASI).

13. The computer-readable storage medium of claim 8, wherein the error-detecting function comprises one of a checksum function and a cyclic redundancy check (CRC) function, the operation further comprising:
prior to attempting to write the first unit of video data to the first storage location, compressing the first unit of video data according to a compression algorithm, wherein the first value is computed after compressing the first unit of video data and prior to attempting to write the first unit of video data to the first storage location.

14. A digital video recorder, comprising:
a processor;
a plurality of input/output (I/O) channels including a first I/O channel;
a storage device;
logic configured to perform an operation comprising:
receiving a first unit of video data of a first video on the first I/O channel, wherein each of the plurality of I/O channels of the digital video recorder are configured to write video data to a storage device;
computing a first value by applying an error-detecting function to the first unit of video data prior to writing the first unit of video data to the storage device;
attempting to write the first unit of video data to a first storage location of the storage device;
computing, after attempting to write the first unit of video data to the first storage location, a second value by applying the error-detecting function to a data stored at the first storage location of the storage device;
comparing the first and second values; and
upon determining, based on the comparison and without configuring any of the plurality of I/O channels as a read channel, that the first and second values are not equal, storing an indication that the first unit of video data was not successfully written to the first storage location of the storage device.

15. The digital video recorder of claim 14, the operation further comprising:
outputting for display, on a display device communicably coupled to the digital video recorder, an indication that the first unit of video data was not successfully written to the first storage location of the storage device.

16. The digital video recorder of claim 14, the operation further comprising:
receiving a second unit of video data of a second video by a second I/O channel of the plurality of I/O channels of the digital video recorder;
computing, by the error-detecting function, a third value for the second unit of video data;
attempting to write the second unit of video data to the first storage location of the storage device communicably coupled to the digital video recorder;
computing, by the error-detecting function, a fourth value for the data stored at the first storage location of the storage device;
comparing the third and fourth values; and
upon determining, based on the comparison, that the third and fourth values are equal, storing an indication that the second unit of video data was successfully compressed and written to the first storage location of the storage device.

17. The digital video recorder of claim 14, wherein each I/O channel of the plurality of I/O channels receives video data of a respective video from a respective video source, of a plurality of video sources, wherein the plurality of I/O channels can be configured as one of a read channel and a write channel, wherein the plurality of video sources comprise: (i) video cameras, (ii) graphics insertion devices, (iii) computing systems, and (iv) video production systems.

18. The digital video recorder of claim 14, wherein the first unit of video data comprises at least one of: (i) a frame of video carried in a serial digital interface (SDI) signal, (ii) an uncompressed portion of video data encapsulated in an Internet Protocol (IP) packet, (iii) a compressed portion of video data encapsulated in the IP packet, and (iv) a compressed transport stream carried over an Asynchronous Serial Interface (ASI).

19. The digital video recorder of claim 14, the operation further comprising:
prior to attempting to write the first unit of video data to the first storage location, compressing the first unit of video data according to a compression algorithm, wherein the first value is computed after compressing the first unit of video data and prior to attempting to write the first unit of video data to the first storage location.

20. The digital video recorder of claim 14, wherein the error-detecting function comprises one of a checksum function and a cyclic redundancy check (CRC) function.

* * * * *

UNITED STATES PATENT AND TRADEMARK OFFICE
CERTIFICATE OF CORRECTION

PATENT NO. : 9,872,060 B1  
APPLICATION NO. : 15/195547  
DATED : January 16, 2018  
INVENTOR(S) : Vladislav Feldman et al.

Page 1 of 1

It is certified that error appears in the above-identified patent and that said Letters Patent is hereby corrected as shown below:

In the Drawings

On sheet 6 of 7, in Figure 5, Line 18, delete "550" and insert -- 560 --, therefor.

In the Specification

In Column 5, Line 6, delete "$104_{1-N}$" and insert -- $104_{1-N}$. --, therefor.

Signed and Sealed this  
Tenth Day of July, 2018

Andrei Iancu  
*Director of the United States Patent and Trademark Office*